United States Patent [19]

Kuchar

[11] Patent Number: 4,852,109
[45] Date of Patent: Jul. 25, 1989

[54] TEMPERATURE CONTROL OF A SOLID STATE FACE PUMPED LASER SLAB BY AN ACTIVE SIDERAIL

[75] Inventor: Norman R. Kuchar, Burnt Hills, N.Y.

[73] Assignee: General Electric Company, Schenectady, N.Y.

[21] Appl. No.: 278,997

[22] Filed: Dec. 2, 1988

[51] Int. Cl.⁴ .............................................. H01S 3/045
[52] U.S. Cl. ........................................ 372/34; 372/35; 372/66
[58] Field of Search ............................. 372/34, 35, 66

[56] References Cited

U.S. PATENT DOCUMENTS

| | | | |
|---|---|---|---|
| 3,633,126 | 1/1972 | Martin et al. | 372/35 |
| 3,665,335 | 5/1972 | Tomiyasu | 372/35 |
| 3,679,996 | 7/1972 | Almasi et al. | 372/66 |
| 3,679,999 | 7/1972 | Chernoch | 372/34 |
| 3,810,040 | 5/1974 | Martin et al. | 372/35 |
| 3,810,041 | 5/1974 | Martin | 372/35 |
| 3,891,945 | 6/1975 | Schlossberg et al. | 372/34 |
| 4,233,567 | 11/1980 | Chernoch | 372/66 |
| 4,378,601 | 3/1983 | Eggleston, III et al. | 372/66 |
| 4,379,203 | 4/1983 | Koszytorz | 174/15 R |
| 4,468,774 | 8/1984 | Robbins | 372/34 |
| 4,528,671 | 7/1985 | Robbins | 372/68 |
| 4,563,763 | 1/1986 | Kuhn | 372/35 |
| 4,644,555 | 2/1987 | Amano | 372/66 |
| 4,653,061 | 3/1987 | Fukae | 372/66 |
| 4,730,324 | 3/1988 | Azad | 372/33 |

Primary Examiner—James W. Davie
Attorney, Agent, or Firm—Paul R. Webb, II; James C. Davis, Jr.

[57] ABSTRACT

Optical and thermal distortion in a solid state slab geometry laser are controlled by active siderails disposed at the lateral surfaces of the slab. Each siderail may have a fluid passage therethrough and be connected in a separate fluid circuit which enables the volumetric flow rate and temperature of the fluid through the passageway to be controlled in order to control the temperature of the siderail and, accordingly, the temperature of the slab in regions proximate to the siderail. The invention enables compensation of asymmetric transverse gradients to afford a uniform transverse temperature distribution.

19 Claims, 4 Drawing Sheets

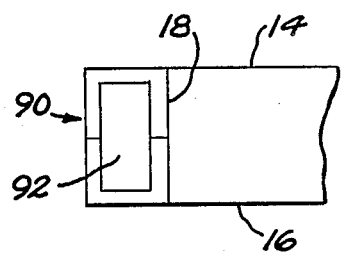
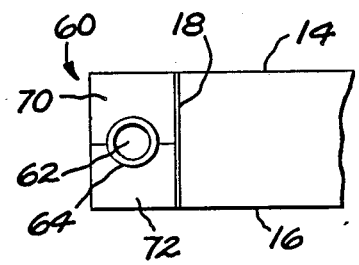
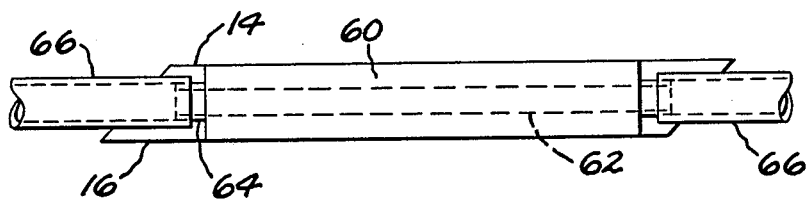
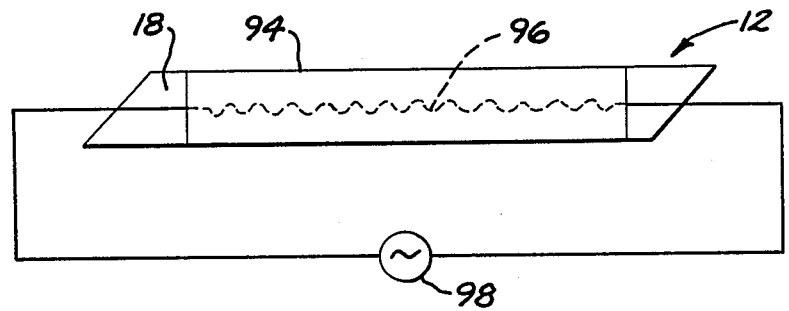

TEMPERATURE CONTROL OF A SOLID STATE FACE PUMPED LASER SLAB BY AN ACTIVE SIDERAIL

BACKGROUND OF THE INVENTION

The present invention relates to solid state slab lasers otherwise known as total internal reflection, face pumped lasers (TIR-FPL), and more particularly to laser devices having improved output power and beam quality performance.

A total internal reflection face pumped laser comprises a solid state lasing medium such as neodymium yttrium aluminum garnet or neodymium glass in the form of a flat generally rectangular slab. The slab is optically pumped by lamps or other sources in such a way that electromagnetic energy impinges on the large planar surfaces of the lasing medium to pump the atoms in the medium to an elevated metastable energy state.

During operation of the laser, considerable heat is generated within the lasing medium in response to optical pumping to produce a population inversion of atoms. Surface cooling, as by passing a fluid coolant over the large planar faces of the slab, for example, is generally employed to remove heat from the lasing medium. Most solid state laser materials, however, have poor thermal conductivity, and surface cooling results in a thermal gradient between the cooled outer surface and the relatively hot center region of the laser slab. This produces a variable thermal strain in the slab, caused by the center of the slab being in compression and the relatively cool surface being in tension. Since the index of refraction of the lasing medium is a function of both temperature and stress, solid state lasers surfer from thermally induced beam defocusing, birefringence and depolarization. Because of thermal gradients, slab lasers typically exhibit both width-wise and thickness-wise wavefront distortions of the laser beam. The thickness-wise distortions are acceptable as long as they are symmetrical with respect to the longitudinal axis. The width-wise distortions caused by the width-wise or transverse temperature gradients are not acceptable. These are most prominent near the lateral side surfaces or faces of the slab, and the optical distortion is most pronounced in such areas. If the variable optical distortion of the beam is large enough, it may not be possible to compensate it with a single lens. In practice, this results in a decrease in the power output of the laser for a given beam quality, where beam quality is defined as the product of the output beam diameter and its angular divergence. With typical slabs having an aspect ratio (slab width to slab thickness) in the range of 2 to 2.5, the region of uniform optical distortion may be limited to about only the central one-third of the slab. While it is acceptable for the temperature of the slab to vary symmetrically across the slab thickness (the small dimension) the temperature should be uniform and should not vary across the major planar surface or face of the slab transverse to the direction of slab thickness.

Attempts to reduce temperature gradients in slab lasers have included the use of siderails in order to control the transverse flow of heat through the lateral faces of the slab. Siderails function as thermal insulators to prevent the transverse flow of heat across the lateral faces, and they assist in achieving a uniform temperature distortion across the major surface of the slab. Siderails, however, have proved to be less than satisfactory.

Although siderails may be good barriers to thermal conduction, they may easily transmit optical and thermal radiation from the optical pumping sources resulting in a high level of slab heating adjacent to the siderails. Consequently, the optical distortion in these regions differs from that in the center of the slab, and this causes decreased output power/beam quality performance.

In order to counteract this effect, partial siderails, i.e., siderails having a height which is less than the thickness of the slab, have been proposed. This enables coolant fluid to contact the exposed portions of the side surfaces of the slab to reduce local heating. Although such partial siderails may afford some uniformity in the transverse thermal distribution and some reduction in optical distortion in the slab, it is difficult to match the proper size of the siderail to the laser, and the siderail height must often be found by trial and error. The siderail must also be tailored to each laser. Moreover, since the temperature gradients in the laser slab are a function of many different variables, a given partial siderail may be effective only over a limited range of optical input power and coolant flow rates.

There is a need for a better way of controlling the transverse temperature gradients in TIR-FPL slab devices which can accommodate a side variation in thermal environments and operating conditions and which may be adjusted or tuned on line to match a particular set of conditions to afford optimum laser performance. It is to these ends that the present invention is directed.

SUMMARY OF THE INVENTION

The invention affords a method of reducing distortion in a solid state laser and a laser device which satisfy the foregoing need and which avoid the disadvantages of known methods and devices by enabling the on-line control of transverse temperature gradients in a slab laser device. This is accomplished in a way which enables the on-line adjustment and control of the thermal energy flux crossing the lateral surfaces of the slab. This enables control of the slab temperature in areas proximate the lateral faces, which, in turn, enables compensation for variations in the transverse thermal distribution across the width of the slab so that the thermal distribution may be maintained uniform and the slab tuned for optimum laser performance.

Broadly stated, the invention affords a method of reducing distortion in a solid state slab laser of the type which comprises a slab of lasing material having a pair of major optical faces disposed parallel to one another and to a longitudinal axis of the slab, and having first and second lateral surfaces disposed perpendicular to the major optical faces at the sides thereof. At least one of the major optical faces has electromagnetic energy impinging thereon to excite atoms in the lasing material to an elevated energy state, and each lateral surface has a siderail disposed thereon. The temperature of each siderail is controlled in order to control the flux of thermal energy across each lateral surface and the slab temperature proximate each lateral surface.

In another aspect, the invention affords a laser device comprising a slab of lasing material having a pair of opposed major optical faces disposed parallel to one another and to a longitudinal axis of the slab, and having first and second opposed lateral surfaces disposed perpendicular to the faces at the sides thereof. Means is provided for impinging electromagnetic energy onto at least one of the faces to excite atoms in the slab to an elevated energy state, and first and second heat transferring means are disposed at the first and second lateral surfaces, respectively, for independently controlling the temperature at each lateral surface to provide a uniform temperature distribution across the slab in a direction transverse to the longitudinal axis.

In another aspect, a siderail may be disposed on each lateral surface of the slab, and means for controlling the temperature of each siderail may be provided in order to control the flux of thermal energy across the associated lateral surface and the slab temperature proximate such surface.

The siderails of the invention are active in the sense that the temperature of each siderail may be actively controlled independently of the other siderail so that the siderail may be heated or cooled in a controlled manner, thereby varying the temperature of the slab adjacent to the siderail. Since the temperature of each siderail can be independently controlled, the siderails can easily compensate for an asymmetrical transverse temperature gradient in the slab. Preferably, each active siderail covers the entire lateral side surface of the slab and is formed of a material which is optically opaque or highly reflective so as to block optical energy from the pumping lamps from impinging on the lateral surfaces of the slab.

BRIEF DESCRIPTION OF THE DRAWINGS

FIG. 5 is a side elevation view of the laser device of FIG. 4;

FIG. 6 is an enlarged partial end view of the laser device of FIG. 5 illustrating a first form of a siderail which may be employed with the laser device;

FIG. 7 is an enlarged partial end view similar to FIG. 6 illustrating another form of a siderail; and FIG. 8 is a side elevation view, partially schematic, illustrating another embodiment of the invention.

DESCRIPTION OF THE PREFERRED EMBODIMENTS

The present invention is specially adapted for use with a total internal reflection face pumped laser (TIR-FPL) of the type disclosed in U.S. Pat. No. 3,633,126 to Martin et al., the disclosure of which is incorporated by reference herein, and will be described in that context. As will be appreciated, however, this is illustrative of only one utility of the invention.

Figure 1:
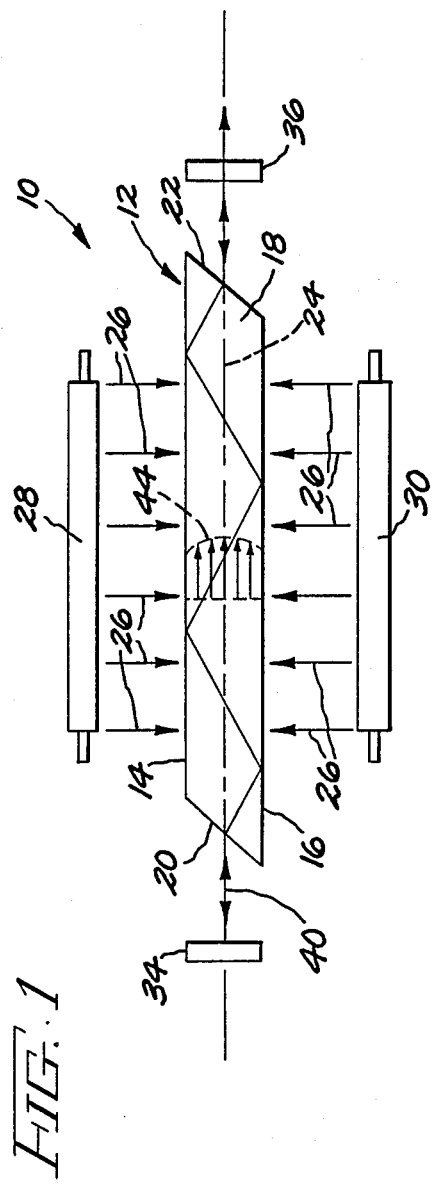
FIG. 1 is a diagrammatic side view of a solid state slab laser of the type with which the invention may be employed, the figure illustrating a symmetrical temperature distribution across the thickness of the slab.
Figure 2:
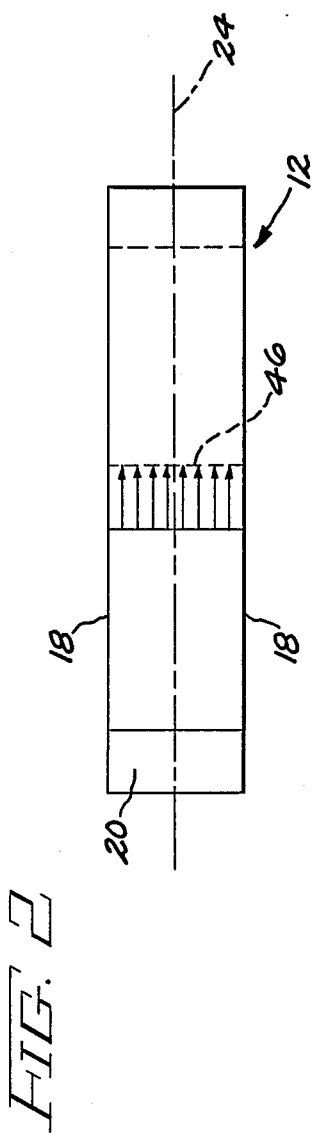
FIG. 2 is a diagrammatic top view of the slab of FIG. 1 and illustrates a uniform transverse temperature distribution across the width of the slab.

Referring to FIGS. 1 and 2, there is illustrated a TIR-FPL fluid cooled laser device 10 comprising a homogenous flat slab 12 of solid state lasing medium, such as neodymium doped yttrium aluminum garnet (Nd: YAG), neodymium doped silicate of phosphate glass, etc. Slab 12 may have a generally rectangular configuration with top and bottom faces 14 and 16, respectively, lateral side faces (surfaces) 18, and end faces 20 and 22. The top and bottom faces 14 and 16, which correspond to the width of the slab, constitute major plane faces which are polished to a high degree of optical flatness and which extend parallel to one another and to a longitudinal axis 24 of the slab. Electromagnetic energy 26, such as optical energy emitted from one or more pumping lamps 28 and 30 disposed adjacent to surfaces 14 and 16, respectively, may impinge upon at least one of the surfaces 14 and 16 and, preferably, upon both. As is well known, the optical energy pumps the atoms in the slab of lasing material to an elevated metastable energy state and produces a population inversion of atoms. The lateral surfaces 18, which correspond to the thickness of the slab, may be disposed generally perpendicular to faces 14 and 16 and parallel to axis 24. End faces 20 and 22 are disposed parallel to one another and oriented at a predetermined angle relative to axis 24, as shown in FIG. 1, and are preferably polished to an optical flatness. A totally reflecting mirror 34 may be disposed adjacent to end face 20 and oriented perpendicular to the longitudinal axis, and a partially reflecting mirror 36 may be disposed adjacent to end face 22 and also oriented perpendicular to axis 24, as shown in FIG. 1.

In operation, lamps 2S and 30 may be energized, e.g., pulsed, to pum optical radiation into the slab of lasing medium through faces 14 and 16 to excite the atoms to an elevated metastable energy state. A beam 40 of coherent radiation is passed generally longitudinally through the slab by multiple internal reflections from the major optical faces 14 and 16 as illustrated in FIG. 1. The coherent beam may be reflected by mirrors 34 and 36 so that it traverses the length of the slab several times. Each time the beam passes through the slab, it is amplified, and the beam may be extracted from end face 22 via partially reflecting mirror 36. In practice, lamps 2S and 30 may be surrounded by reflectors (not shown) to reflect the optical energy emitted by the lamps onto the major faces 14 and 16, and the slab may be cooled by a longitudinal fluid flow across the major faces (also not shown) as described, for example, in the Martin et al. patent referenced above.

The electromagnetic energy impinging upon the faces 14 and 16 of the slab causes the internal temperature in the slab to increase. In practice, the temperature distribution throughout the slab will be non-uniform. The material forming the lasing medium of the slab generally has poor thermal conductivity. In addition, optical energy may impinge upon the lateral surfaces 18 of the slab and the energy impinging upon the major plane faces 14 and 16 may be non-uniform due to non-uniformities in the lamps or in the reflector design. These results in temperature gradients in the slab, which produce a variable thermal strain and cause variations in optical distortion patterns. Although it is acceptable for the temperature distribution within the slab to vary symmetrically across the thickness of the slab (parallel to lateral surfaces 18), as illustrated at 44 in FIG. 1, the transverse temperature distribution across the width of the slab (parallel to the major optical faces) should be uniform, as shown at 46 in FIG. 2, so that the temperature distribution within the slab is one-dimensional.

Figure 3A:
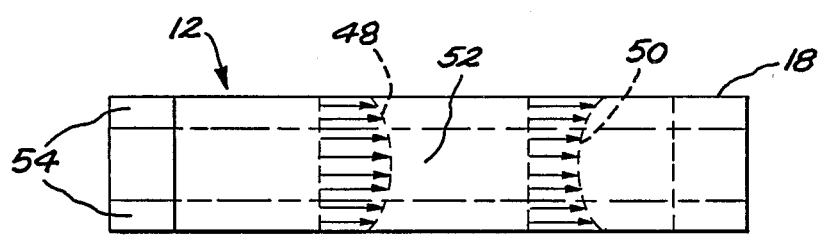
FIG. 3A, 3B and 3C are, respectively, diagrammatic top, side and end views showing a slab laser subjected to non-uniform transverse temperature distributions and illustrating slab regions adversely affected by transverse temperature gradients.
Figure 3B:
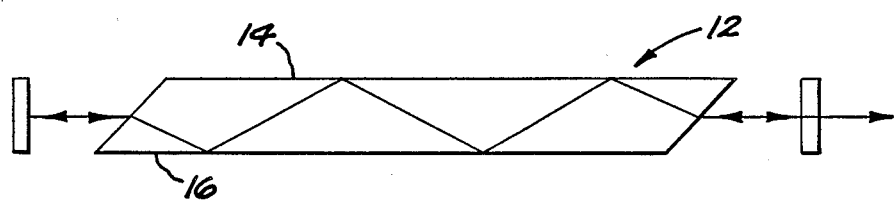
Figure 3C:
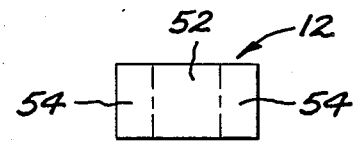

The symmetrical temperature distribution 44 and uniform temperature distribution 46 shown in FIGS. 1 and 2, respectively, represent ideal temperature distributions. FIG. 3A illustrates examples of non-uniform temperature distributions 48 and 50 which produce adverse transverse temperature gradients in the slab. As shown, the effects of these adverse temperature gradients tend to be most prominent near the lateral sides 18 of the slab, and the influence of the thermal environment at the lateral surfaces may be felt over regions of the slab width which extend inwardly from the surfaces a distance which can be as much as the thickness of the slab. With typical slabs of aspect ratios (width to thickness) in the range of 2 to 2.5, the region of uniform optical distortion corresponding to zero thermal gradient may be limited to a central area 52 of the slab corresponding to only approximately one-third of the slab width. The remaining areas 54 on opposite sides of the central region 52 and adjacent to the lateral faces 18 are those which experience the strongest effect from the adverse temperature gradients and result in the largest optical distortion. If the optical distortion patterns are large enough, they may not be capable of being compensated by a single lens. This effectively limits the power output of the laser for a given beam quality (the product of output beam diameter and its angular divergence).

The invention compensates for such transverse temperature gradients and improves the output power and beam quality performance of TIR-FPL laser device by means of a different type of siderail. It has been found that siderails formed of an opaque material, e.g., a ceramic, and siderails having highly reflective surfaces, as of silver, afford reduced transmission flux of optical and thermal energy into the slab, and lead to reduced optical distortion and improved performance. The performance, however, is not optimum. It has been very difficult to find a siderail configuration which widens the low distortion central area 52 of the slab beyond about one-half to two-thirds of the slab width. Also, it has been found that the optical distortion pattern sometimes may be asymmetric, i.e., different near the opposite lateral faces of the slab. This asymmetry may be attributed to variations in the thermal environment on the two sides, due possibly to asymmetries in the energy impingement from the reflectors, to differences in coolant flow over the major optical faces of the slab, or, in the case of thin siderails affording coolant flow around their outside, to variable amounts of coolant flow. Being inert, the effectiveness of such passive siderails is limited and dependent upon their ability to balance thermal fluxes from and to the surroundings of the slab. Also, the siderails cannot be adjusted on line to compensate for extraneous variations. The invention avoids this by providing an active siderail configuration, as will now be described.

Figure 4:
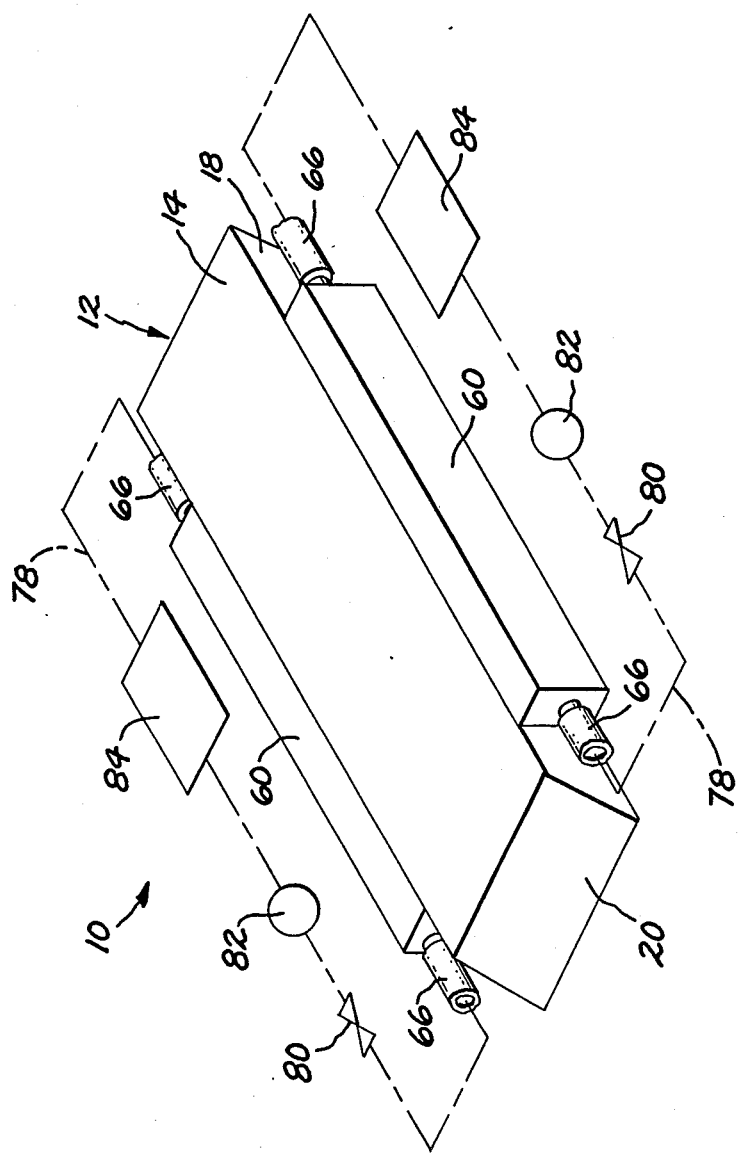
FIG. 4 is a perspective view, partially schematic, illustrating a laser device in accordance with the invention.

FIG. 4 is a perspective view of the slab laser of FIG. 1 embodying a pair of active siderails 60 in accordance with a first embodiment of the invention. FIGS. 5 and 6 illustrate one of the siderails 60 in somewhat more detail. In FIGS. 4-6, elements of the slab laser which correspond to elements previously illustrated and described are designated by like reference numerals. As will be described in more detail shortly, the siderails of the invention include provisions enabling heat to be added or removed from the siderail so that its temperature and, therefore, the heat transfer between the siderails and the slab, can be controlled.

As shown in FIGS. 4-6, each siderail 60 may comprise an elongated member disposed on and preferably bonded to an associated lateral face 18 of the slab. The siderail preferably extends over most of the surface of the lateral face, having a height which matches the thickness of the slab, and a length which is at least preferably greater than the optically pumped length of the slab, i.e., greater than the length of lamps 28 and 30 as shown in FIG. 1. The width of the siderail (parallel to the major planar optical faces of the slab) is not critical, although it is expected that the width of the siderail would normally be approximately equal to the thickness of the slab. (In FIGS. 4 and 6, the width of siderails 60 is illustrated as being somewhat less than the slab thickness.)

The siderails may be formed of an opaque machinable ceramic, such as Macor or alumina, or a highly reflective material such as silver. Such materials transmit only a small portion of the optical energy impinging upon their surfaces, and, accordingly, block optical energy from the lamps from impinging on the lateral side surfaces of the slab. This prevents the optical energy from affecting the slab temperature proximate such lateral sides. In the form illustrated in FIGS. 4-6, siderail 60 may be formed with a passageway 62 which extends longitudinally the length of the siderail parallel to its longitudinal axis. The passageway may be located at the center line of the siderail, and the siderail may have tubular members 64 extending longitudinally from the ends of the siderails for connection with a corresponding conduit 66. The siderail may be formed by bonding two pieces of material together (such as 70 and 72 shown in FIG. 5) one or both of which may have a groove machined in it so as to form the passageway. The passageway may also be bored through a unitary piece of material, or the siderail may be extruded to the proper shape, depending upon the material from which it is formed. The siderails may be bonded to the lateral surfaces of the slab using an organic adhesive, such as RTV or the like. Preferably, the bonding is continuous over the entire contiguous siderail/surface, with the thickness of the bonding agent being kept small but uniform over that length.

As shown in FIG. 4, conduits 66 of each siderail 60 may be connected to a corresponding fluid circuit 78 comprising, for example, a valve 80, a pump 82, and a heat exchanger 84 (all illustrated schematically in the figure). Each siderail is connected to a separate fluid circuit 78, as shown. The fluid circuits enable a fluid, either a liquid or a gas, to be passed through the passageway 62 of each siderail so as to control the siderail temperature. This enables control of the flux of thermal energy across each lateral surface 18 of the slab, and permits the addition or removal of heat to or from the slab so that the slab temperature proximate each lateral surface may be controlled. The temperature of the fluid flowing through each siderail and, in turn, the temperature of the siderail, may be controlled closely by circuit 78, as by controlling the volumetric flow rate of the fluid through the passageway by means of either valve 80 or pump 82, or both, and/or by controlling the inlet temperature of the fluid to the siderail by means of heat exchanger 84. The rate of heat transfer between the fluid and the siderail may be determined by well-known equations of forced convection heat transfer, and depends upon the flow rate of the fluid, the difference between the fluid inlet temperature and the siderail temperature, and the physical properties of the fluid and siderail.

The active siderail of the invention thus serves as a heat exchanger with reference to the slab, and heat can be transferred between the siderail and the adjacent slab surfaces precisely and in a controlled manner by controlling the heat transfer rate between the fluid and the siderail. By controlling the siderail temperature, the temperature of the slab adjacent to the siderail can be controlled. In turn, this affords control over the temperature distribution across the width of the slab. This embodiment of the invention enables the slab temperature to be either increased or decreased depending upon the temperature of the fluid.

Advantageously, since each siderail is connected to a separate fluid circuit 78, the temperature of the two siderails on opposite sides of the slab, and the heat transfer between each siderail and its associated side, may be controlled independently. This enables compensation for asymmetric temperature distributions in the slab, and enables the performance of the laser device to be controlled on-line to optimize the laser's performance. Final adjustments may be made on line by measuring the optical distortion from the laser and adjusting the temperature of each siderail, as by adjusting the volumetric flow rate, until the distortion is uniform across a large transverse portion of the slab. As may be appreciated, the arrangement illustrated in FIG. 4 enables rather precise on-line control of the temperature distribution in the slab.

FIG. 7 illustrates an alternative form of a siderail 90 in accordance with the invention, in which the passageway 92 through the siderail may have a rectangular shape, as shown, and may constitute the largest part of the siderail dimensions. The siderail may be formed, for example, by bonding a pair of U-shaped channel members together. Because of its large size, passageway 92 affords a larger volumetric flow rate and greater heat transfer between the fluid and the siderail, as well as a more uniform temperature distribution over the lateral surface 18 of the slab, than that afforded by passageway 62 of siderail 60. The siderail may, of course, take other forms and may include, for example, a plurality of individual passageways through the siderail.

FIG. 8 illustrates another embodiment of the slab laser device in accordance with the invention in which an active siderail 94 applied to the lateral faces 18 of slab 12 embodies a resistive electrical heating element 96 which is connected to a source 98 of electrical current. By adjusting the current flow through the heating element, heat may be transferred to the siderail and its temperature may be increased in a controlled manner. Using this embodiment, the siderail and slab can only be heated. This embodiment would be useful to compensate for a temperature distribution such as 48 shown in FIG. 3A where it is desired to increase the temperature of the slab proximate to each lateral side surface of the slab. Again, each siderail 94 on opposite sides of the slab is preferably connected to a separate electrical circuit to enable independent control of the siderail temperatures in order to reduce asymmetries in the transverse temperature variation of the slab.

While preferred embodiments of the invention have been shown and described, it will be appreciated by those skilled in the art that changes may be made in these embodiments without departing from the principles and spirit of the invention, the scope of which is defined in the appended claims.

What is claimed is:

1. A method of reducing distortion in a solid state laser of the type which comprises a slab of lasing material having a pair of major optical faces disposed parallel to one another and to a longitudinal axis of the slab, at least one face having electromagnetic energy impinging thereon to excite atoms in the lasing material to an elevated energy state, and first and second lateral surfaces disposed perpendicularly to the faces at the sides thereof, each lateral surface having a siderail thereon, the method comprising controlling the temperature of each siderail in order to control a flux of thermal energy across each of the lateral surfaces and a slab temperature proximate each lateral surface.

2. The method of claim 1, wherein said controlling comprises independently controlling the temperature of each siderail to produce a uniform temperature distribution across the slab.

3. The method of claim 1, wherein each siderail has a passageway, and said controlling comprises passing a fluid through the passageway to vary the temperature of the siderail.

4. The method of claim 3, wherein said controlling comprises controlling a volumetric flow rate and an inlet temperature of the fluid in order to control the heat transfer between the fluid and the siderail.

5. The method of claim 1, wherein each siderail has an electrical heater, and wherein said controlling comprises controlling the supply of electrical current to the electrical heater.

6. A laser device comprising a slab of lasing material having a pair of opposed major optical faces disposed parallel to one another and to a longitudinal axis of the slab, and having first and second opposed lateral surfaces disposed perpendicular to the faces at the sides thereof; means for impinging electromagnetic energy onto at least one of the faces to excite atoms in the slab to an elevated energy state; first and second heat transferring means disposed at the first and second lateral surfaces, respectively, for independently controlling the temperature at each lateral surface to provide a uniform temperature distribution across the slab in a direction transverse to the longitudinal axis.

7. The laser device of claim 6, wherein said heat transferring means comprises first and second siderails bonded to the first and second lateral surfaces, respectively, and means for controlling the temperature of each siderail.

8. The laser device of claim 7, wherein the temperature controlling means comprises means for controlling a volumetric flow rate of a fluid passing through a passageway in each siderail, and means for controlling a temperature of the fluid entering the passageway, to control a flux of thermal energy across each lateral surface.

9. The laser device of claim 7, wherein each siderail has an electrical heater element within the siderail, and means for controlling electrical current to the heater element.

10. The laser device of claim 6, wherein said laser device comprises a total internal reflection face pumped laser, and said slab has a generally rectangular configuration.

11. A laser device comprising a slab of lasing material having a pair of opposed major optical faces disposed parallel to one another and to a longitudinal axis of the slab, and having first and second opposed lateral surfaces disposed perpendicularly to the faces at the sides thereof; a siderail disposed on each lateral surface;

means for impinging electromagnetic radiation onto at least one of the faces of the slab to excite atoms in the slab to an elevated energy state; and means for controlling the temperature of each siderail in order to control the flux of thermal energy across a corresponding lateral surface upon which the siderail is disposed and the slab temperature proximate such lateral surface.

12. The laser device of claim 11, wherein said controlling means comprises means for independently controlling the temperature of each siderail to compensate for an asymmetrical temperature variation transverse to the longitudinal axis.

13. The laser device of claim 11, wherein each siderail has a passageway therethrough, and the temperature controlling means comprises means for passing a fluid through the passageway, and means for controlling a volumetric flow rate and a temperature of the fluid in order to control heat transfer between the fluid and the siderail.

14. The laser device of claim 13, wherein each siderail comprises a pair of members, each having a groove therein, which are joined together to form the passageway therethrough.

15. The laser device of claim 11, wherein each siderail has an electrical heater element, and the temperature controlling means comprises means for controlling an electrical current supplied to the heater element.

16. The laser device of claim 11, wherein the siderails have a dimensional parallel to the lateral surfaces which matches the dimension of the lateral surfaces, and have a length parallel to the longitudinal axis which is greater than a length over which said electromagnetic energy is supplied to said face.

17. The laser device of claim 11, wherein the siderails are formed of another material which blocks optical energy from impinging on the lateral surfaces.

18. The laser device of claim 17, wherein said other material comprises an opaque ceramic.

19. The laser device of claim 17, wherein said other material is reflective.

* * * * *